United States Patent [19]

Meyerson et al.

[11] Patent Number: 5,579,487
[45] Date of Patent: Nov. 26, 1996

[54] PORTABLE WORK SLATE COMPUTER WITH MULTIPLE DOCKING POSITIONS FOR INTERCHANGEABLY RECEIVING REMOVABLE MODULES

[75] Inventors: Robert F. Meyerson, Captiva Island, Fla.; Yung-Fu Chang, Medina, Ohio; Ynjiun P. Wang, Ft. Myers, Fla.; Daniel G. Wall, Union Town, Ohio

[73] Assignee: Teletransaction, Inc., Akron, Ohio

[21] Appl. No.: 269,190

[22] Filed: Jun. 30, 1994

Related U.S. Application Data

[63] Continuation-in-part of Ser. No. 956,112, Oct. 2, 1992, abandoned.

[51] Int. Cl.$^6$ ................................................ G06F 13/00
[52] U.S. Cl. ........................ 395/280; 395/282; 395/651; 395/800
[58] Field of Search ................................ 395/282, 280, 395/700, 800

[56] References Cited

U.S. PATENT DOCUMENTS

| | | | |
|---|---|---|---|
| 4,683,550 | 7/1987 | Jindrick et al. | 364/900 |
| 5,377,357 | 12/1994 | Nishigaki et al. | 395/800 |
| 5,386,567 | 1/1995 | Lien et al. | 395/700 |
| 5,392,447 | 2/1995 | Schlack et al. | 395/800 |

*Primary Examiner*—Jack B. Harvey
*Assistant Examiner*—John Travis
*Attorney, Agent, or Firm*—Watts, Hoffmann, Fisher & Heinke Co

[57] ABSTRACT

A configurable electronic work slate unit includes a customizable array of data devices and input/output devices which are selectively integrated in a compact and highly ergonomic structure. Increased operator productivity is accomplished by use of several possible user interface media including a multi-function display and input/output unit including a digitizer, position sensitive screen, and video display panel. Selectively integratable user interface components include a bar code scanner, RF modulator for radio frequency communication, modem, audio input/output, as well as the multi-purpose display. All components are integrated by use of a handle unit or module docking assembly which can house a battery as well as removable modules in a manner so as to minimize operator fatigue and discomfort, as well as enhance productivity. Configuration, reconfiguration and updating of work slate units by choice and selection of removable modules, from a variety of different types of modules, is enhanced by utilization of standardized interfaces which are intercoupled to a common signal bus. The bus configuration in combination with a bus controller functions as an intelligent bus capable of identifying types of removable modules and configuring communication protocols for operation with different types of removable modules.

12 Claims, 9 Drawing Sheets

PORTABLE WORK SLATE COMPUTER WITH MULTIPLE DOCKING POSITIONS FOR INTERCHANGEABLY RECEIVING REMOVABLE MODULES

This is a continuation in part of application Ser. No. 07/956,112, filed Oct. 2, 1992, now abandoned.

This invention relates to portable data entry, display and processing terminals and, more particularly, to improved kinds of portable work slate units which are configurable by selection of a changeable complement of removable modules from a wide variety of types. The work slate units provide operation on a highly integrated basis with operational capabilities determined by the particular selection of removable modules, whose inclusion and interchangeability are facilitated by a standardized docking interface and intelligent bus arrangement.

BACKGROUND OF THE INVENTION

Electronic work slate units are employed in full-time day-to-day operation in field uses such as inventory control and delivery tracking, and will be described with particular reference thereto. Present day on-site services and delivery services increasingly rely on automated inventory control, remote data acquisition, and on-going data communication with their base of operations. Many technologies have evolved which allow for use of automation in these areas. These technologies include widespread use of inventory indicia readily susceptible to automated inventory control. These include package coding such as bar coding, RF coding, and the like. Further, advances in remote communications such as is provided with present-day cellular communication, as well as remote point-to-point data communications such as via modem/telephone interconnect, enable virtually constant data interchange between a home unit and a remote site.

Such remote data collection has spawned a first generation of portable data devices, such as that provided by U.S. Pat. No. 4,279,021 entitled Portable Data Entry Apparatus Including Plural Selectable Functional Configurations, assigned to Telxon Corporation. While such first generation units served well, a greater portion of the work force is entering, or posed to enter use of such remote data units. The increase in usage will require greater adaptability and features available to the portable unit to accomplish disparate uses with minimized costs associated with such application-specific areas. Further, greater utilization requires greater resources to be expended educating a user base. Accordingly, a more user-friendly interface would also be advantageous. Finally, increased reliance on data devices means that operators will be using them over extended periods of time throughout a work day. Accordingly, increased ergonomics to lessen user fatigue and increase productivity would also be advantageous.

The present invention contemplates a new and improved remote-data acquisition and processor unit which overcomes the above referred problems, and others, and provides a unit which may be comfortably utilized for extended periods with lessened fatigue, which provides an interface which requires minimized operator training, as well as a unit which integrates only those functions required to a specific application to minimize component costs, while simultaneously preserving expansion ability. The invention also enables such units to be configured, reconfigured and upgraded by selection of removable modules in order to provide operational capabilities selected to meet the requirements of a wide range of applications.

SUMMARY OF THE INVENTION

In accordance with the present invention, there is provided a highly integrated portable electronic work slate unit which includes a central processor. The central processor unit is supported by random access memory (RAM) or other types of memory for storage of programs and data. A user interface or input/output unit includes a relatively large multi-purpose display panel commonly termed a "work slate". The display panel is adapted for low power consuming visual display of graphics and character-based information. The display may also be touch-sensitive to facilitate receipt of user input by human touch. The display also includes an electromagnetic transducer to facilitate receipt of user input via a pen-based stylus.

In one embodiment of the invention, a configurable electronic work slate unit, with a changeable complement of removable modules, includes a work slate basic assembly including a frontal display and associated processor and memory elements. The work slate unit also has a hand-grippable module docking assembly configured for mechanical and electrical coupling to the back of the basic assembly and including a plurality of first docking positions each arranged to mechanically accommodate a removable module selected from a plurality of removable module types providing different functional capabilities. Each of the first docking positions has an associated standardized docking interface for enabling coupling of signals. The module docking assembly includes a grippable section configured to enable gripping and support of the slate unit by one hand during use. A plurality of removable modules are removably positioned in at least some of the plurality of first docking positions of the module docking assembly. Each of such removable modules includes a standardized module interface configured to cooperate with any one of the standardized docking interfaces. In this embodiment, the plurality of removable modules includes at least two modules selected from the following types of removable modules: a power module; an RF communication module, an antenna module, a wide area network module, a narrow band transceiver module, a satellite transceiver module, a laser scanner module; a CCD scanner module, a 2-D CCD scanner module, a touch memory module, a voice module, a handwriting recognition module, a display module, a keypad module, a modem module, a coprocessor module, a CPU module, a memory module, a printer module, a magnetic strip reader module.

As an example, a portable electronic work slate unit configured for use as a portable parcel tracking unit may include the following types of removable modules: a 2-D scanner module, a printer module, an RF communication module, a first power module and a second power module.

In order to achieve module interchangeability, a portable electronic work slate unit wherein the standardized docking interface and the standardized module interface are mating electrical conductor configurations, may desirably include at least one signal coupling path enabling the processor element of the basic assembly to identify the particular type of removable module which is removably positioned in any docking position of the module docking assembly (e.g., by accessing a stored code). The work slate unit may additionally include stored programming for supporting operation of a plurality of types of removable modules (including removable modules currently positioned in individual ones of the docking positions and additional removable modules which may later be positioned in individual ones of the docking positions) in combination with the work slate unit. Also, the stored programming typically includes provision for accepting the installation of additional programming for supporting operation of additional types of removable modules whose operation was not supported by the stored programming as initially configured.

In accordance with another aspect of the present invention, the multi-purpose display is adapted for receiving selected ones of a plurality of overlays on at least a portion thereof so as to allow for customization in accordance with specific user needs, such as alphanumeric data entry.

Also in accordance with the invention, a configurable electronic unit, operable with a changeable complement of removable modules via an intelligent bus, includes the following. A plurality of docking positions are each arranged to mechanically accommodate a removable module selected from a plurality of removable module types providing different operational capabilities. A plurality of standardized docking interfaces, each associated with one of the docking positions, are each configured to enable coupling of signals to and from a removable module of any of such plurality of types. A bus configuration is arranged to enable coupling of signals to and from each of the standardized docking interfaces. A removable module of one of the plurality of types is removably positioned in a selected docking position and includes a standardized module interface configured to cooperate with a standardized docking interface. The configurable electronic unit further includes a bus controller, coupled to the bus configuration, and arranged to identify the type of removable module positioned in the selected docking position to enable other elements of the configurable electronic unit to do at least one of: control the operation of the removable module, receive data from the removable module, provide data to the removable module for storage, provide data to the removable module for transmission, receive electrical power from the removable module, operate cooperatively with the removable module.

In accordance with another aspect of the present invention, selectively includable integratable input/output components in the form of removable modules include a radio frequency modulator for RF communication, a modulation device for infrared communication, a bar code reader, an audio input/output unit, bulk storage such as an integrated hard disk, a modem, and other modules.

In accordance with another aspect of the present invention, an ergonomic housing is provided for containing the various subassemblies of the invention.

An advantage of the present system is the provision of a highly-integrated data acquisition and processing unit which is component-customizable to particular user applications. Configurability options are enhanced by use of a variety of removable modules accessible via a standardized interface.

Another advantage of the present system is the provision of a unit which is adapted for providing an interface which requires minimal user training.

Yet another advantage of the present system is the provision of a unit with improved ergonomics to minimize operator fatigue through extended uses.

Further advantages will become apparent to one of ordinary skill in the art upon reading and understanding the following description.

BRIEF DESCRIPTION OF THE DRAWINGS

The invention may take physical form in certain parts and arrangements of parts, the preferred embodiment of which will be described in detail in this specification and illustrated in the accompanying drawings which form a part thereof, and wherein.

DETAILED DESCRIPTION OF PREFERRED EMBODIMENT

Figure 1:
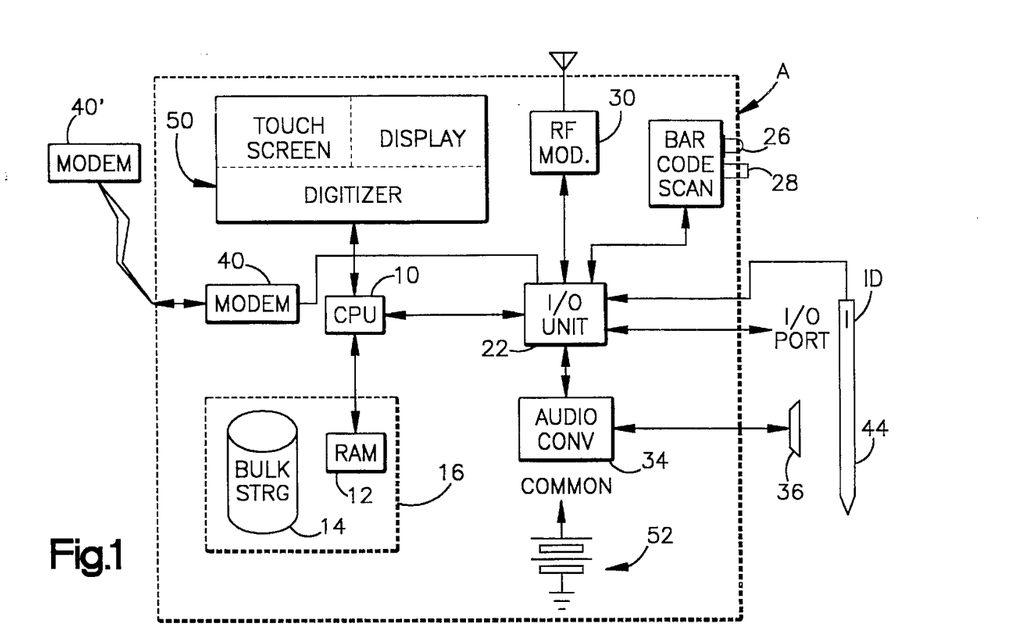
FIG. 1 illustrates, in block diagram form, the data processing and input/output component of an embodiment of the subject invention.

Referring now to the drawings, wherein the showings are for purposes of illustrating the preferred embodiment of the invention only, and not for the purposes of limiting same, FIG. 1 shows, in block diagram form, a highly integrated portable electronic work slate unit A. The unit A includes a central processor unit ("CPU") 10 advantageously formed of a microprocessor. Current microprocessor technology advantageously provides high data throughput capability and memory addressing. Further, the recent generation of microprocessor-based CPUs also incorporates power management capabilities which are particularly advantageous with battery-powered units. Finally, a maturation of software associated with microprocessor-based design has resulted in various operating system options, including DOS, UNIX, and the like. Further, the microprocessor-based operating system market has also matured from menuing interfaces to include graphical user interfaces ("GUIs"). Such GUIs have further progressed to the point where they can receive pen-based input on appropriate hardware, in addition to the more traditional keyboard or mouse inputs.

Several pen-based systems are currently available. These include PEN-WINDOWS of Microsoft Corporation, Redmond, Wash., as well as an analogous PENPOINT interface by GO Corporation. The microprocessor is suitably formed by an 80386SL processor of Intel Corporation of Santa Clara, Calif. or equivalent. The "386SL" chip or its counterparts advantageously provide a large address space, support for the above-noted GUI interfaces, as well as integrated advanced power management capabilities.

The processor of the preferred embodiment is an F 8680 of Chips & Technologies, Inc. While this processor is advantageously employed in the preferred embodiment, it will be appreciated that the rapidly evolving state of microprocessor design will provide a continuous stream of improved processors which provide these advantages, and more. It will be appreciated further that any such processor can advantageously be used in connection with the subject invention.

The CPU 10 is provided with random access memory ("RAM") 12 within its address space. Although RAM is commonly formed of dynamic random access memory ("DRAM"), certain other memory options provide advantages when use as a replacement for or substitute to DRAM.

DRAM is presently very compact, as well as inexpensive. However, it suffers from volatility. That is, memory contents are lost when electric power to the DRAM is interrupted. Permanent or non-volatile RAM is not presently as compact as DRAM, but is advantageously employed for at least a portion of the memory 12. Such non-volatile RAM may suitably include read-only memory ("ROM") or alterable semi-permanent memory such as currently available flash-EEPROM (electrically erasable programmable read-only memory). Such non-volatile memory is also available in card-based systems such as IC cards, flash EEPROM cards, PCMCIA expansion cards, and the like. Also, an intermediate fast or cache ram is also advantageously employed in RAM 12, especially when relatively slow memory is utilized as compared to CPU speed.

The subject system also employs a selectively-includable bulk storage medium 14 such as a hard disk. Current hard disk technology has reduced relatively high-capacity hard disks to a form factor less than 1.5 inches. The low mass associated with such compact hard drives facilitates quick response and low power consumption due to lessened inertia associated with low-mass media rotation. Together, the RAM unit 12 and bulk storage unit 14 form memory unit 16. With an appropriate operating system, a combination of bulk storage and RAM provided within memory 16 can form a virtual memory system to CPU 10 as will be appreciated.

The CPU 10 is also placed in data communication with an I/O unit 22. The I/O unit 22 is suited to facilitate use of selected one of a plurality of I/O devices in the form of removable module, as will be further described. This advantageously provides modularity which allows for customization of the device to the requirements of particular and disparate user needs. As illustrated, such removable modules, represented in block form, include a bar code scanner 24, which is illustrated with a solid-state laser-diode illumination device 26 and a photo receptor 28. A multi-purpose I/O port is suitably formed of a RS-232 serial port or a parallel port and is advantageously provided to allow interconnection with a printer, network device or other external peripheral.

A second module is formed by an RF modulation unit 30. Such RF modulation facilitates various remote communication prospects, such as via cellular networks, spread spectrum radio, wide area radio networks and satellite communication. RF modules to accomplish these tasks are commercially available and well within the understanding of one of ordinary skill in the art.

Another removable module adapted for interface with I/O unit 22 is formed from an audio conversion unit 34. Current GUI interfaces have seamlessly integrated audio capabilities. Audio provides immediate and effective feedback from an application which augments human cognition. Further, conventional audio conversion technology has evolved to allow for limited application interface by human operator speech. Although present technology for such speech recognition is limited to discrete word annunciation, user specific voice or limited vocabulary, such schemes are extremely advantageous in a remote data acquisition environment.

Illustrated in electrical communication with audio conversion unit 34 is an audio transducer module 36 which is suitably formed of a speaker, microphone, or combination of the two.

An additional I/O component interface with I/O unit 22 is a modulation/demodulation ("modem") module 40. Conventional modem technology facilitates generation of an audio signal representative of a digitized data stream which is easily propagated via conventional telephone lines. The modulated audio data is communicated to a secondary modem such as that illustrated by 40'. The I/O unit 22 is also adapted for interaction with a stylus or pen-based device such as pen or stylus 44. The connection between stylus 44 and the unit A is suitably physical, RF, or optical as is conventional within the art. The stylus 44 advantageously includes a unique identifier ID, to preclude communication with any unit other than a designated unit. This significantly improves data security, particularly when no physical connection between the stylus and base unit exists. The stylus 44 interacts with the pen-base operating system described above when coupled with an appropriate interface. Such an interface is provided by a multi-function display unit for user interface unit 50.

In the preferred embodiment, the multi-function display 50 includes a generally-planar video display panel. This system advantageously provides low-power generation of pixel-based data. Accordingly, both graphical displays, as well as characters, are generatable. Liquid crystal technology affords acceptable pixel resolution which is combined with low-power consumption, particularly in passive-matrix designs. The display advantageously provides user touch-sensitivity, as well as digitizer capabilities when utilized with an electromagnetic, electrostatic or optical stylus such as that provided by stylus 44. This layering as achieved by available technology will be illustrated further below.

As will be apparent from the foregoing, the entire data processing and acquisition unit A has been chosen such that the components are compact and consume minimal power. Accordingly, the entire unit is adapted for powering by a single battery unit 52 which is integrated therein. In the preferred embodiment, the battery unit 52 is formed of a rechargeable-battery such as nickel-cadmium, nickel-metal-hydride, or the like. With this arrangement, the handle unit typically comprises about 25 percent of a total weight of the entire unit.

Figure 2:
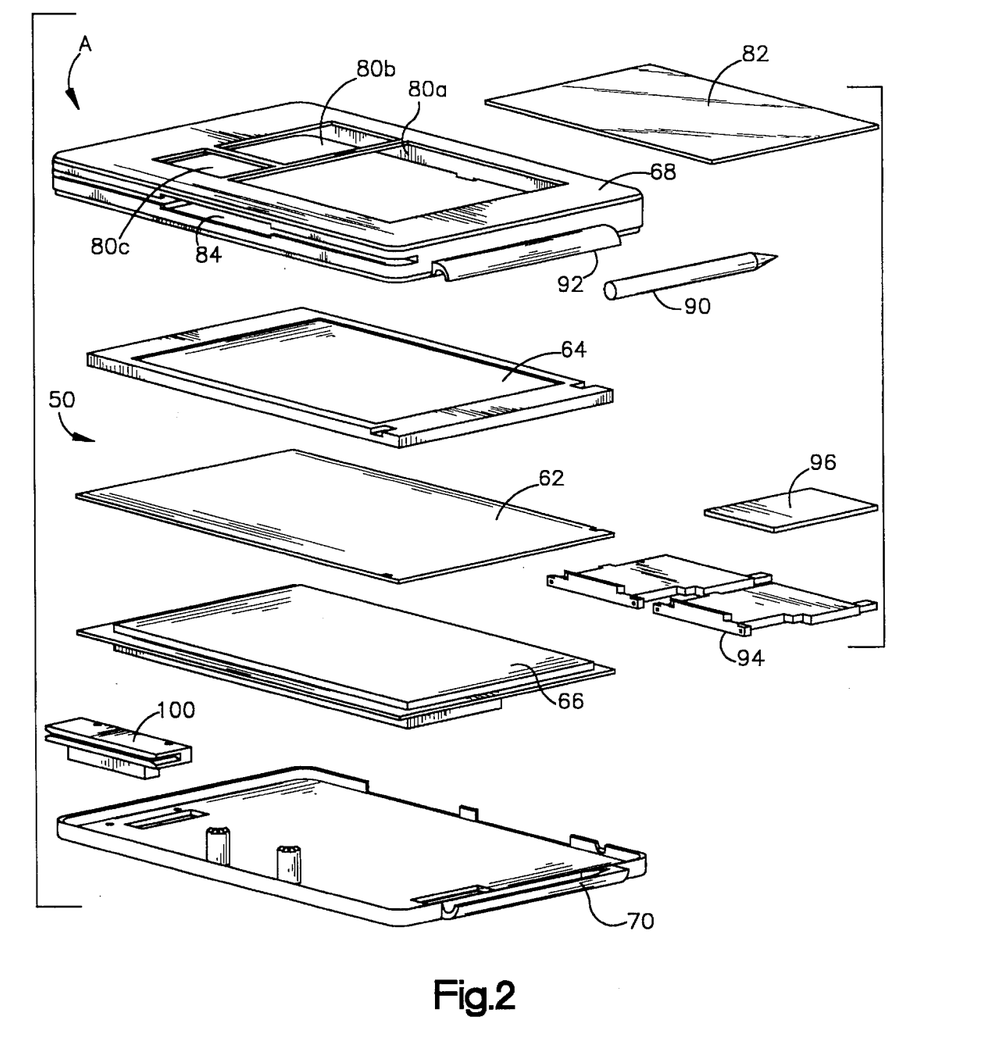
FIG. 2 illustrates, in an exploded view, the layering utilized by the multi-purpose display terminal portion in one form of the subject invention.

Turning now to FIG. 2, there is shown an exploded view of the unit A. As illustrated in this embodiment, this unit includes a plurality of sheet units, shown as including a digitizer 62 and a display 64 which are planar in this configuration. The display 64 is comprised of a flat panel LCD display portion. Accordingly, characters or graphic information provided by the display portion 64 are viewable by a user. User input via touch or stylus is suitably integratable to the GUI display generated by the GUI interface and as illustrated on the display portion. A more detailed discussion on a suitably adapted multi-purpose display may be found in U.S. Pat. No. 4,686,332 entitled "Combined Finger Touch and Stylus Detection System for Use of the Viewing Surface of a Visual Display Device", the contents of which are incorporated herein by reference.

FIG. 2 also illustrates a main circuit board 66, configured as a sheet unit, on which the primary electronic constituent components are suitably positioned. The main circuit board 66 is advantageously disposed below the digitizer to allow for planar construction, thereby maintaining the system form and ergonomics. The digitizer 62, display 64, and the printed circuit board 66 are disposed between upper and lower shell portions 68 and 70, respectively. The shell portions are suitably formed from any polymer compound which is known to provide a lightweight, high-impact tolerant shell.

The upper shell 68 includes one or more aperture portions 80, illustrated as portions 80*a*, 80*b* and 80*c*. The aperture portions 80 alternatively allow a visual display and facilitate user input while allowing for electrostatic communication between window 82 and the unit A for the reasons noted below. It will be appreciated that the subject orientation of the digitizer 62 and the display 64 facilitates selected designation of the display area as user input, information display, or both. For example, the illustrated embodiment may simply provide primary information display in aperture portion 80*a*. Although aperture portions may thereby be primarily designated for data entry or output, the combination of display and digitizer provides for intra-aperture variation. For example, "buttons" or touch sensitive areas may have indicia thereon modified during operation to communicate modified input associated therewith.

The above-described configuration of the upper shell portion 68 is advantageously adapted with a window portion 82. The window 82 is slidably received in a slot portion 84, of the upper shell 80*a* sized to receive it matingly therein. The window 82 of the preferred embodiment provides position or touch sensitivity via implementation suitable electromagnetic, electrical, or optical transducers. The window 82 advantageously bears suitable indicia particular to a given operator task. Various windows 82 may be received into the slot portion 84 to provide a default user data entry/display template for a specified job.

Also illustrated in FIG. 2 is a stylus or pen unit 90 which is securable onto a mount 92. As noted above, the subject system is adapted for hand-writing recognition in concert with the digitizer 62, as well as touch-sensitive data entry. The pen 90 is selectively usable in connection with this interface as will be appreciated by one of ordinary skill in the art. When the pen 90 is utilized for writing input, a portion of the display is advantageously utilized to allow user specified numeric or alpha hand-writing. That is, hand written data entry, under today's technology, benefits from a prior knowledge as to whether alpha-based text or numeric data is to be expected. So designating a portion of the user interface as a indicator allows for increased data recognition, integrity, and reliability. When this is used, an operator would, for example, tap the area when numeric data is written and again tap the area when non-numeric or other character-based data is to be expected. Use of this system also allows for minimized processor power requirement, as well as a more responsive overall system due to lessened calculations.

FIG. 2 also illustrates a magnetic stripe reader 100 which is optionally fixedly secured into the system within the lower shell portion 70. Such magnetic stripe readers are advantageously used for data input as will be appreciated by one of ordinary skill in the art. Also illustrated is a series of PCMCIA peripherals, including a memory cartridge 94 and memory card 96. A growing number of PCMCIA components, such as flash EEPROM cards, modems, and the like are finding increased availability and usage in connection with compact computer designs.

Figure 3:
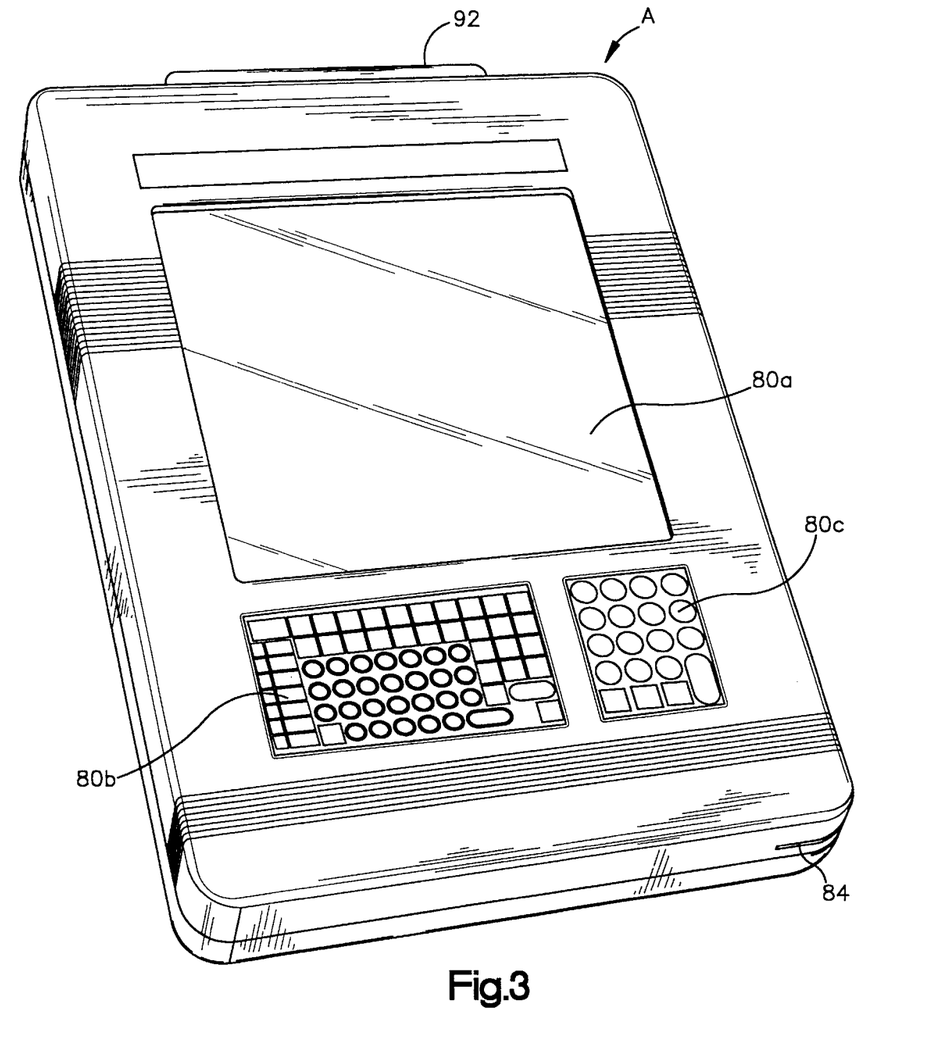
FIG. 3 illustrates a front view of one embodiment of a compact and ergonomic multi-function electronic work slate of the subject invention.

Turning now to FIG. 3, a front view of an assembled system of FIG. 2 is provided. This figure provides a better illustration of the input/display portion. It will be seen that in this embodiment the aperture portion 80*a* is earmarked for data viewing, while the portions 80*b* and 80*c* have been provided with touch sensitive "key" areas to facilitate data entry. Also evidenced is the slot portion 84 to receive the window 82 (FIG. 2) in the manner described above.

Figure 4:
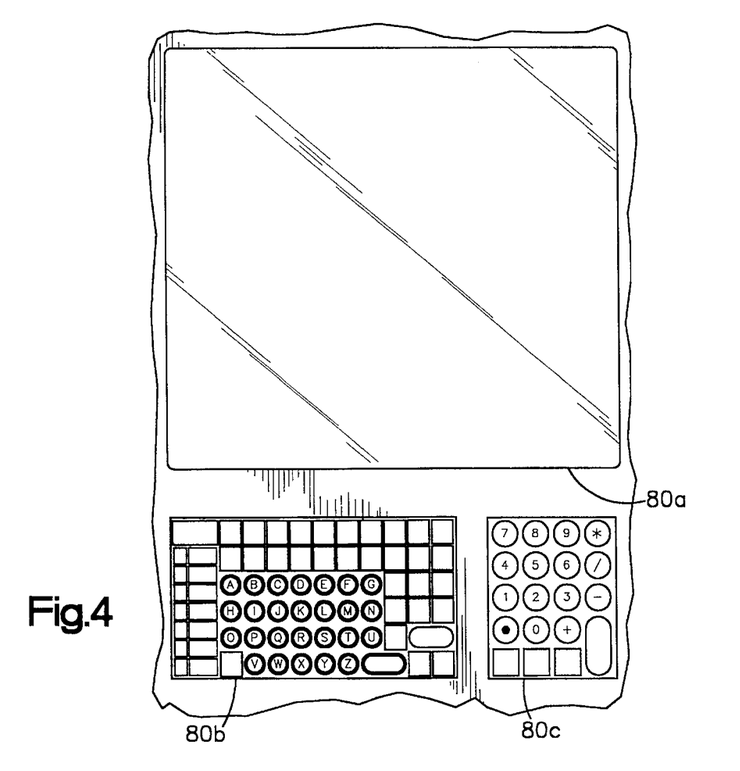
FIG. 4 illustrates an adaptation of the user interface of the display portion of FIG. 3.

Turning now to FIG. 4, suitable application-specific indicia for the various aperture portions is evidenced. Therein, it will be seen that the aperture portion 80*a* remains primarily for visual display. The portion 80*b* has been provided with touch sensitive areas directed to alphabetic key entry, as well as specific jobs-related information. The portion 80*c* has been provided with a numeric keypad for number entry. The example format of FIG. 4 is suitably defined by a combination of a specific window 82, as well as software definition for the display.

Figure 5:
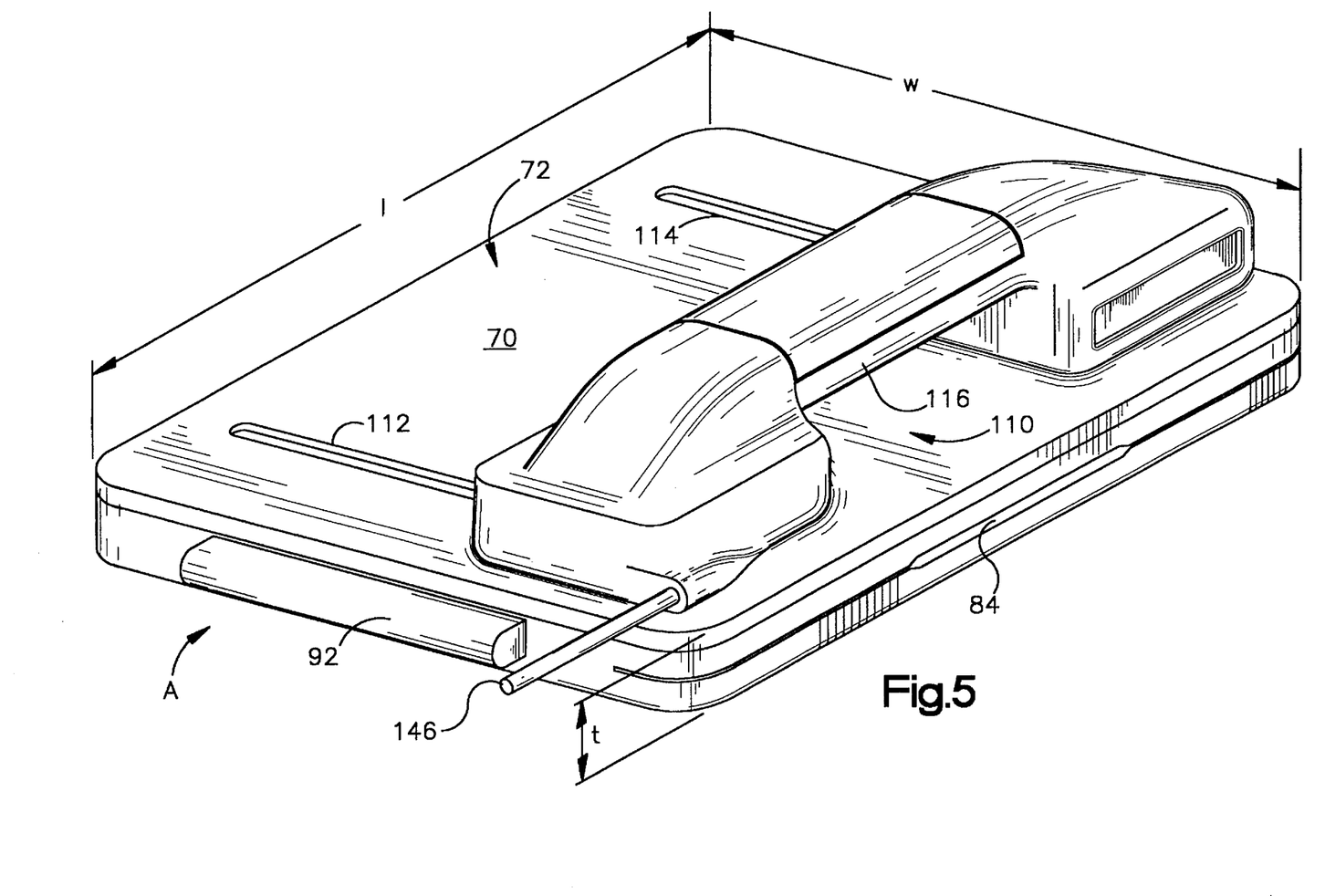
FIG. 5 illustrates a rear view of the unit of FIG. 3.

Turning now to FIG. 5, pictured is a rear view of the unit A, thereby exposing a multi-functional handle portion 110 attached thereto. The handle portion 110 is advantageously usable to minimize operator fatigue and also functions to hold various components or subassemblies necessary or desirable for a particular job application as will be described further below.

The handle 110 is advantageously selectably positionable or secured slidably to a base unit 70 via first and second mounting slots 112 and 114, respectively. Typically, an operator will use the apparatus by grasping it with one hand so as to render the display viewable, while leaving the other hand free for data entry. Such an orientation is comfortably provided for by provision of a grip portion 116 of the handle 110, around which an operator's fingers of the support arm are curled. The bottom or lower shell portion 70 is then resting on the operator's forearm. The moveable mounting allows for positioning the handle 110 relative to the base unit 72 to accommodate, equally comfortably, right or left handed users and may include intermediate handle positions. However, it will be appreciated that a default position is also suitably provided for both such users by permanently securing the handle 110 relative to the base unit 72. Such a permanent mounting facilitates acceptable ergonomics while lowering fabrication costs necessary to communicate data and power between the base unit 72 and the handle unit 110.

Next, the particular fabrication of the handle unit 110 will be described with added reference to FIG. 6. It will be seen from the illustration that, in addition to the grip 116, the handle 110 includes first or second distal portions 118 and 120, respectively. The grip 116 includes a removable door portion 122, the opening of which reveals a battery compartment 124 adapted to receive therein a battery 130. Presently, a significant portion of the weight associated with portable data processing devices is within the battery. Thus disposing the battery 130 within the grip 116 allows for placement thereon at that user's hand, thereby providing advantageous weight distribution and corresponding lessened operator fatigue and increased operator comfort. With this arrangement, it will be seen that with the distal portions extending from the central handle section along a gripping axis defined by handle 110, the weight of the entire handle unit is distributed along this gripping axis, providing an ergonomically enhanced weight distribution. Further, the battery is readily accessible for replacement or charging.

The handle 110 also provides selective incorporation of a plurality of the peripheral units, such as the removable modules noted above. These are placed within one of the distal portions 118 or 120 which function as a module docking assembly including first and second compartment regions. Shown are several removable modules for illustrative purposes. The modules adapted for selective incorporation in this example, include a radio transceiver unit 134, wide area network ("WAN") module 136, and narrow band transceiver 138, and a satellite transceiver 140. In this fashion, the handle unit may be selectively placed with communication devices necessary for a particular task without undue costs, redundancy, or weight. Further, placement of the modules within the handle distributes the weight analogously to that noted in connection with the battery 130, thus increasing the ergonomics.

In the preferred embodiment, the unit A has a length L of approximately 11.25 inches, a width W of approximately 8.5 inches, and a thickness T of approximately 1.2 inches. The length and width thus approximate the size of a sheet of paper.

Figure 6:
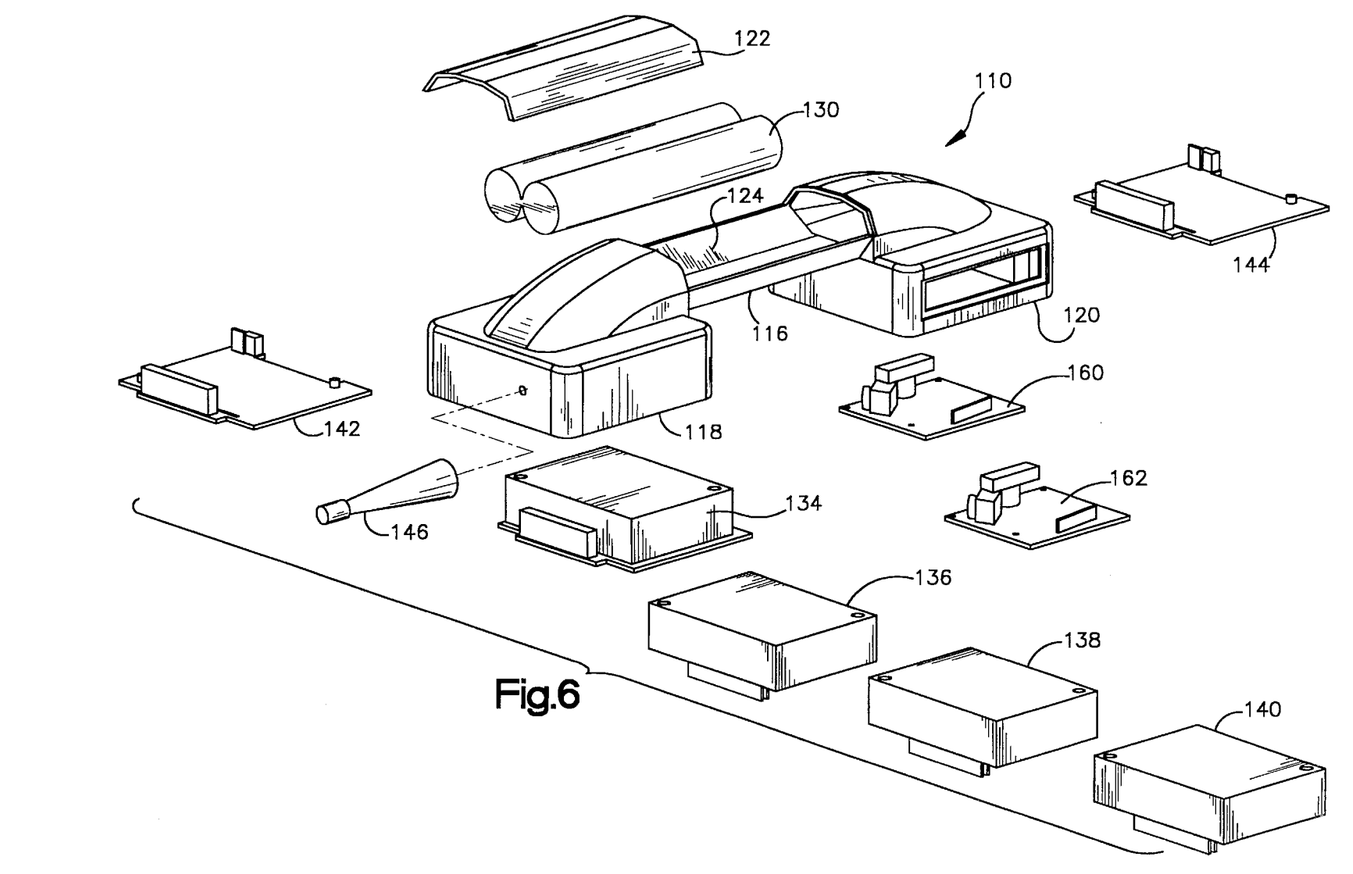
FIG. 6 illustrates an exploded view of the handle portion of the unit of FIG. 3.
Figure 7A:
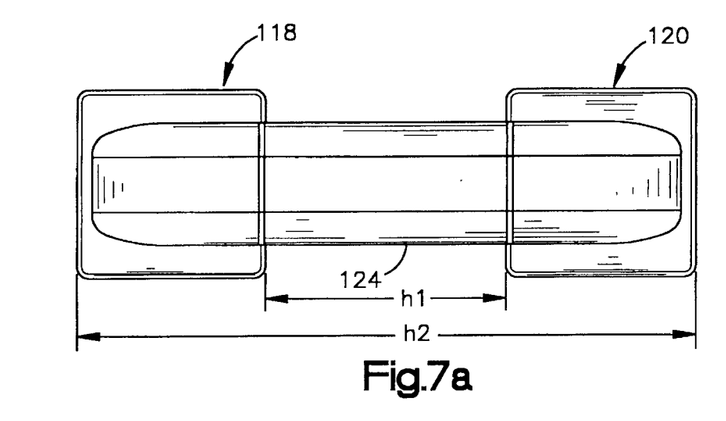
FIG. 7 illustrates several views of the ergonometric handle unit of the unit of FIG. 3.
Figure 7B:
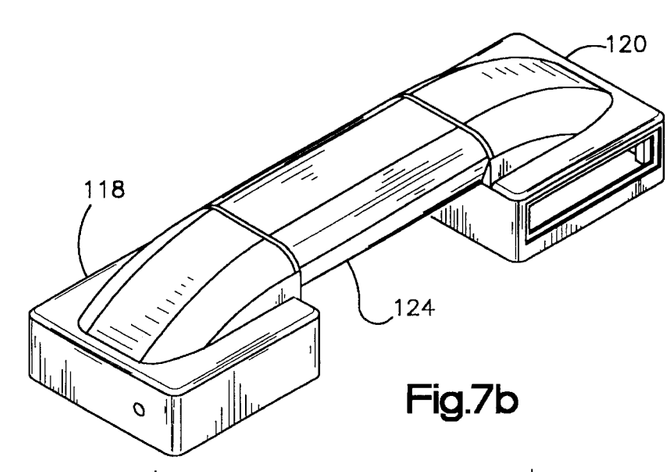
Figure 7C:
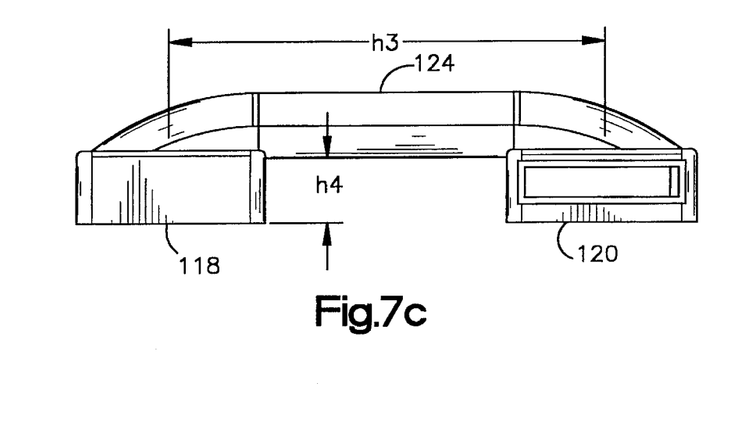
Figure 7D:
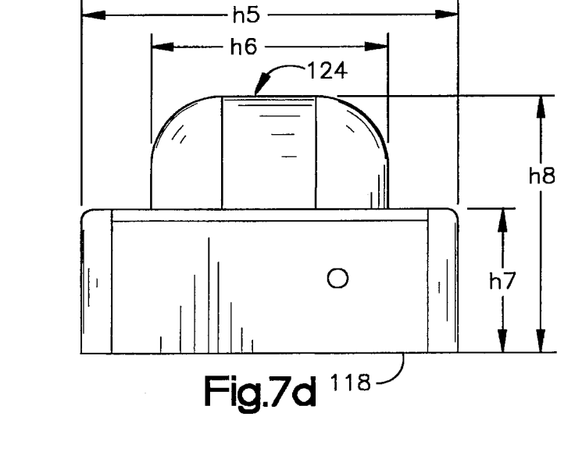

Also illustrated within FIG. 6 are several additional removable modules which may alternatively be used in connection therewith. Included are a charge coupled device ("CCD") unit 160 and a bar code scanner 162 such as a 2D or 1D scanner. Such modules may also include a CPU unit 142 advantageously used to provide independent intelligence or processor power. Also, additional memory may also be placed just within the handle as evidenced by a memory unit 144.

Also evidenced in FIG. 6 is an antenna module 146 which is matingly receivable on distal portion 118, as illustrated. The antenna 146 provides for communication when radio transmission, such as that facilitated by radio transceiver 134, WAN transceiver 136, or narrow band transceiver 138 are utilized.

Turning to FIG. 7, the dimension of the handle 110 providing the ergonomically advantageous dimensions of the preferred embodiment will be described. Suitable dimensions are as follows:

h1=4.3"
h2=11.0"
h3=7.5"
h4=1.1"
h5=3.25"
h6=2.08"
h7=1.25"
h8=2.2"

FIGS. 8–13

Figure 8A:
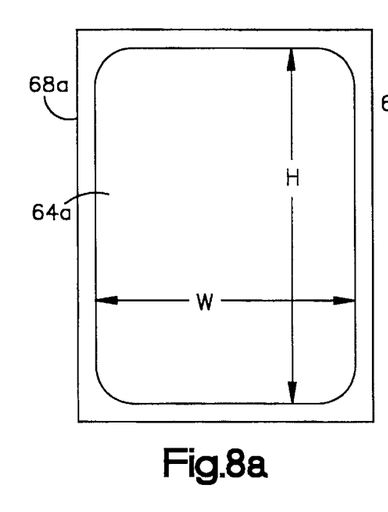
FIG. 8 includes several views of an embodiment of a configurable work slate unit in accordance with the invention.
Figure 8B:
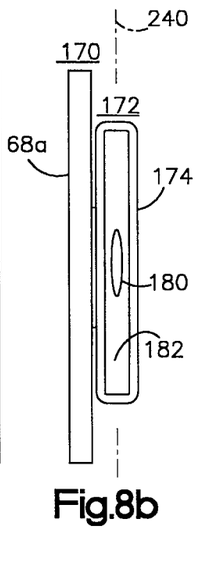
Figure 8C:
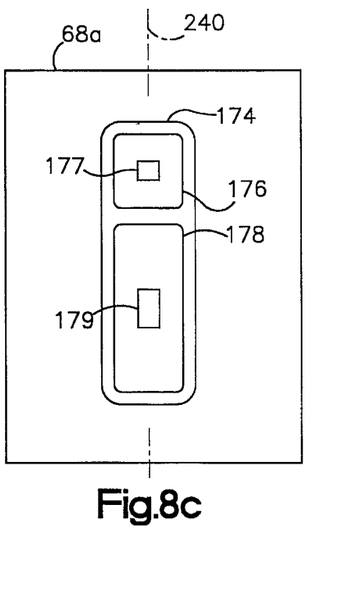

Referring now to FIG. 8 there is illustrated an additional embodiment of the invention in the form of a configurable electronic work slate unit with a changeable complement of removable modules. FIG. 8(a) is a front view showing frontal display 64a within shell unit 68a. FIG. 8(b) is a side view showing two of the basic components of the work slate unit in the form of work slate basic assembly 170 (of which shell unit 68a is visible) and hand-grippable module docking assembly 172 (of which outer shell 174 is visible). FIG. 8(c) is a back view in which the outer shell 174 of the module docking assembly includes two external removable module mounting positions 176 and 178 respectively including electromechanical docking positions 177 and 179 for external attachment of removable modules, as will be described.

As shown in the FIG. 8(a) front view, the work slate unit includes a frontal display 64a having a height H and a width W. In this embodiment, display 64a is planar and is in the form of a removable sheet unit, as will be further described. As shown in the FIG. 8(b) side view, the hand-grippable module docking assembly 172 is configured for mechanical and electrical coupling to the back of the basic assembly 170. Such coupling is provided using available mechanical and electrical coupling technology to provide a coupling configuration suitable for attaching module docking assembly 172 to the back of basic assembly 170 in a manner which may also enable assembly 172 to be rotated or removed, as previously discussed with reference to handle unit 110 of FIG. 5. Electrical coupling is suitably provided by direct connection using one or more connectors or flexible wire connections, or via optical, radio, capacitive or other coupling arrangements applicable by skilled persons. As visible in FIG. 8(b), module docking assembly outer shell 174 includes indented areas in the sides of its central section which are configured for gripping by a user's hand. In this view, indentation 180 on the visible side of outer shell 174 is provided on a door portion 182. In other embodiments the gripping indentations may be provided as a pattern of small indentations or in other form suitable to enhance non-slip gripping areas on both sides of outer shell 174.

Figure 9A:
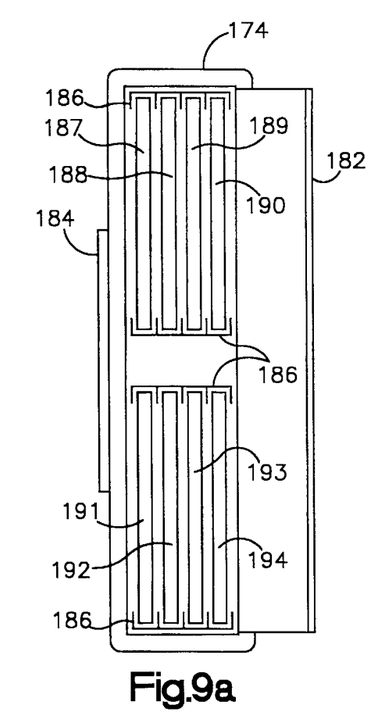
FIG. 9 includes two views of the module docking assembly portion of the work slate unit of FIG. 8.
Figure 9B:
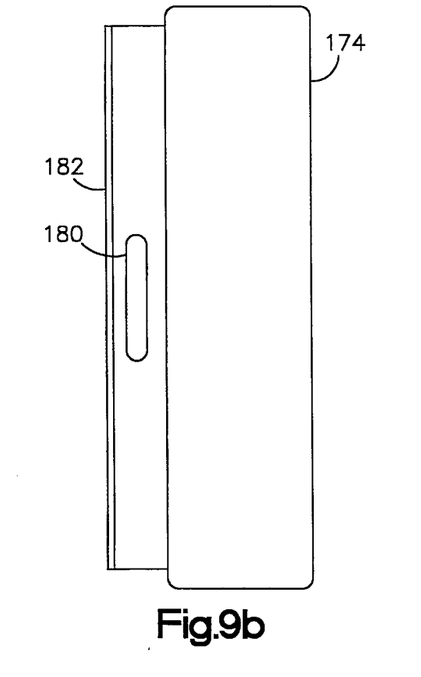

FIG. 9(a) is an enlarged view of module docking assembly 172 as shown in FIG. 8(b), separated from basic assembly 170 and with door portion 182 opened at an obtuse angle to the side of outer shell 174. FIG. 9(b) is a corresponding back view of docking assembly 172, without the external mounting positions 176 and 178 of FIG. 8(c). In FIG. 9(a) the previously discussed mechanical and electrical coupling is visible in side profile at 184. In FIG. 9(a), the module docking assembly includes a plurality of first docking positions each arranged to mechanically accommodate a removable module. As illustrated, eight docking positions are provided by guides 186 which are arranged to enable eight removable modules 187–194 to be slidably positioned within outer shell 174 of the module docking assembly. As will be described further with reference to the FIG. 11 schematic drawing, each of the eight first docking positions (shown respectively occupied by the removable modules 187–194) has an associated standardized module docking interface for enabling coupling of signals.

Figure 10A:
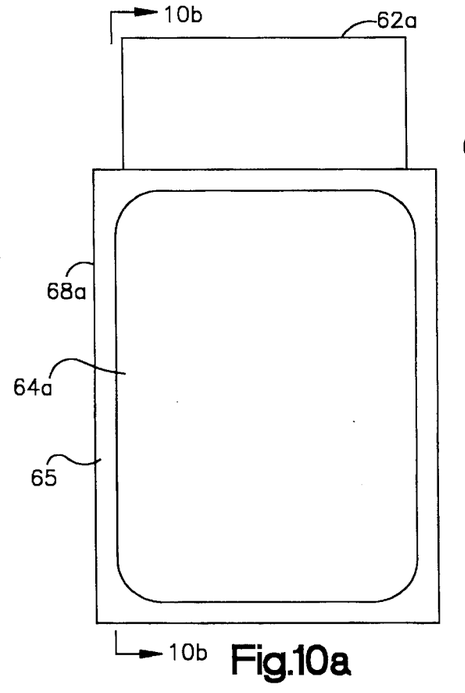
FIG. 10 includes two views of the basic assembly portion of the work slate unit of FIG. 8.
Figure 10B:
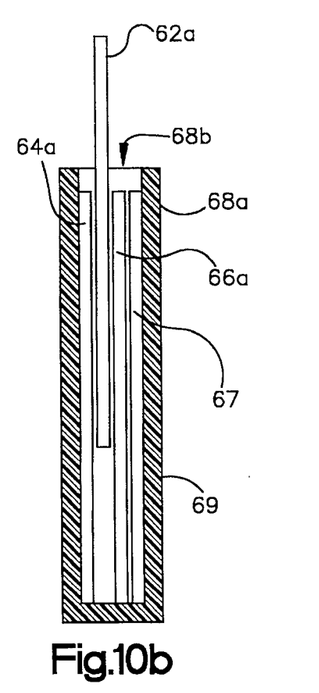

FIGS. 10(a) and 10(b) are enlarged front and sectional side views of the work slate basic assembly 170 separated from module docking assembly 172. Shell unit 68a includes a back 69 and a substantially rectangular frame portion 65 having a side opening at 68b (in this example, in the top side of the shell unit) and a plurality of standardized frame interfaces at the opposite side (i.e., at the bottom). As illustrated in FIGS. 10(a) and 10(b) a removable sheet unit in the form of digitizer 62a is partially removed from shell unit 68a via opening 68b. The standardized frame interfaces, which may be electrical connectors, are provided at the bottom of shell unit 68a and will be described further with reference to FIG. 11. The removable display, digitizer, processor/memory and power sheet units 64a, 62a, 66a and 67, respectively, as shown in FIG. 10(b) each incorporate a standardized sheet interface configured to cooperate with any one of the standardized frame interfaces included within shell unit 68a. As shown, these sheet units are slidably installed and removable and the standardized interfaces permit replacement of a touch sensitive resistive digitizer unit with an electromagnetic digitizer for pen-based operation, replacement of the processor/memory unit with a later generation processor/memory unit, etc.

Figure 11:
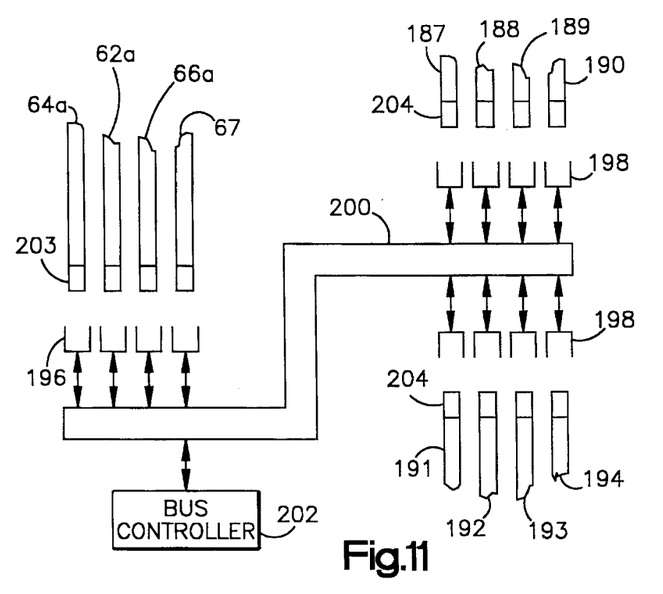
FIG. 11 is a schematic diagram useful in describing intercoupling bus features of the work slate unit of FIG. 8.

With reference now to FIG. 11, there is provided a schematic type representation showing each of the standardized frame interfaces of the work slate basic assembly (as represented by an electrical connector 196, shown in simplified form) intercoupled to each other and to each of the standardized docking interfaces of the module docking assembly (as represented by electrical connectors 198, shown in simplified form) via a bus configuration 200. Bus configuration 200, in combination with bus controller 202, functions as an intelligent bus arrangement capable of identifying types of removable modules and appropriately configuring communication protocols, as will be described in greater detail below. In FIG. 11, each of the units 64a, 62a, 66a and 67 of the basic assembly is shown as including a standardized sheet interface 203 configured to cooperate with any one of the standardized frame interfaces 196. Correspondingly, each of the removable modules 187–194 includes a standardized module interface 204 configured to cooperate with any one of the standardized docking interfaces 198. Interfaces 196 and 198 may be identical or different from each other, as appropriate in particular embodiments; interfaces 203 and 204 are correspondingly identical or different. While discussed in this embodiment as electrical connectors, cooperating interfaces 196 and 203, and cooperating interfaces 198 and 204, may comprise optical, radio, capacitative or other suitable coupling arrangements applicable by skilled persons. In typical embodiments, each standardized interface is arranged to provide at least one signal coupling path which is usable to enable the processor element (CPU) of the slate unit to identify the particular type of each removable module removably positioned in each of the first docking positions of the module docking assembly and of each sheet unit removably positioned within the basic assembly. Suitable codes may be readily stored in the removable modules and sheet units for this purpose. In the example of electrical connectors, mating connectors functioning as interfaces 198 and 204, for example, may each provide at least 42 signal coupling paths, typically including 8 data port paths, 24 address paths, 8 control port paths and 2 power coupling paths. Time, frequency or code multiplex and other multisignal transmission techniques operable with a smaller number of signal paths can also be utilized.

With this arrangement in accordance with the invention, processor/memory unit 66a is enabled, using known networking and control techniques, to communicate with (e.g., send control instructions to and receive information from) any of the removable modules 187–194 positioned in docking positions of the module docking assembly, as well as any of the other units 64a, 62a and 67 of the basic assembly. To provide a high level of configurability of the slate unit, the slate unit may include stored programming suitable for supporting operation of a plurality of types of removable modules (including removable modules currently positioned in individual ones of the docking positions and additional removable modules which may later be added or substituted) in operative combination in the slate unit. In addition, the stored programming may include provision for accepting the installation of additional programming for supporting operation of additional and new types of removable modules whose operation was not supported by the stored programming as initially configured.

Figure 12:
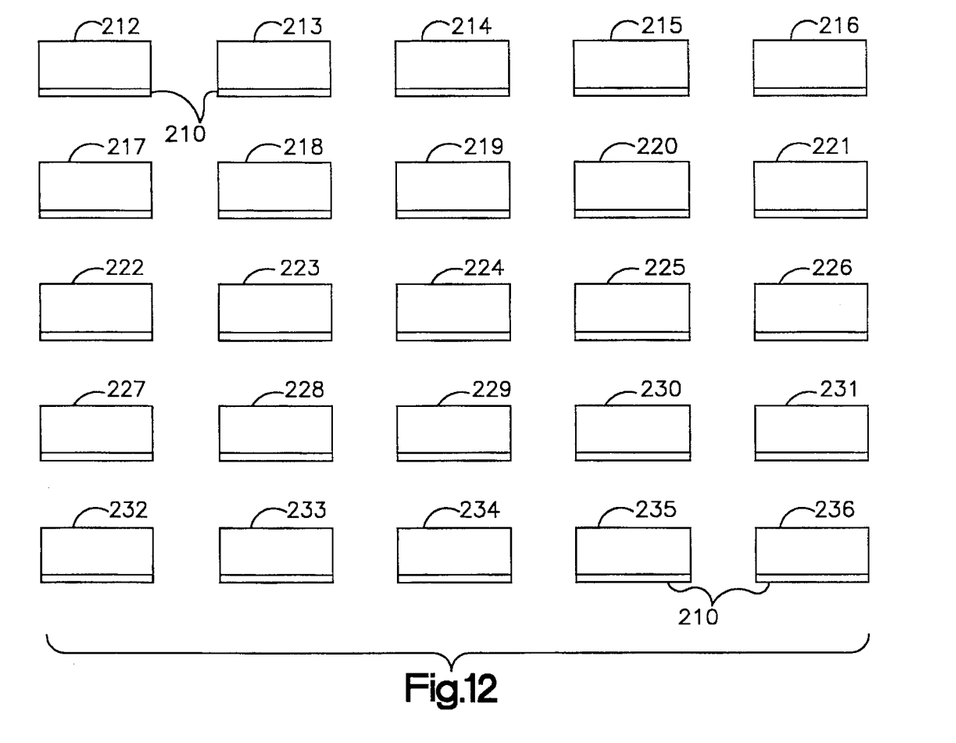
FIG. 12 shows in block form a variety of removable modules usable with the work slate unit of FIG. 8.

FIG. 12 illustrates a sampling of different types of removable modules which may be removably positioned in first docking positions of the module docking assembly of work slate units in accordance with the invention. While these modules are shown in block form which may represent insertable cards or boards incorporating appropriate components and circuitry (not shown), removable modules may take any form appropriate for a particular embodiment and other such forms are previously described and illustrated in FIG. 6 (e.g., modules 142, 144, 146, 134, 136, 138, 140, 160 and 162). As will be described further, module docking assemblies may also include one or more second docking positions having a docking interface of a form different from the standardized docking interface, in order to accommodate module embodiments having a module interface configured to cooperate with such different form of docking interface. Examples are the second docking positions 176 and 178 of FIG. 8(c), which include different forms of mechanical/electrical interfaces 177 and 179 configured to support externally mounted modules such as an auxiliary display module mountable to interface 177 and a keyboard/calculator module mountable to interface 179. Also, in FIG. 13 there is shown an external bar code scanner 206 detachably mounted to the end of the module docking assembly. The following types of removable modules are shown in block form in FIG. 11, each including a standardized module interface, typically indicated at 210: a power module 212; an RF communication module 213; an antenna module 214; a wide area network module 215; a narrow band transceiver module 216; a satellite transceiver module 217; a laser scanner module 218; a CCD scanner module 219; a 2-D CCD scanner module 220; a touch memory module 221; a voice module 222; a handwriting recognition module 223; a display module 224; a keypad module 225; a modem module 226; coprocessor module 227; a CPU module 228; a memory module 229; a printer module 230; a magnetic stripe reader module 231; an input/output module 232; an audio conversion module 233; an audio transducer module 234; a stylus module 235; and an auxiliary power module 236. Other, modified, combined and integrated types of modules may also be provided by persons skilled in the art as new requirements and desired operating characteristics are identified.

Figure 13A:
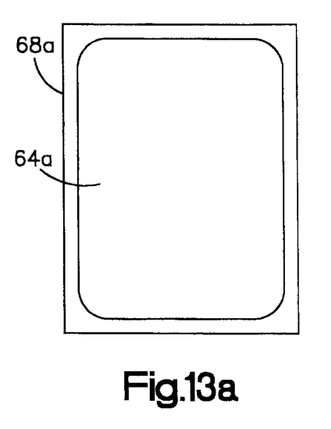
FIG. 13 illustrates an alternate embodiment of the work slate unit of FIG. 8.
Figure 13B:
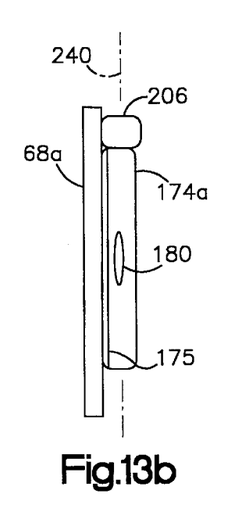
Figure 13C:
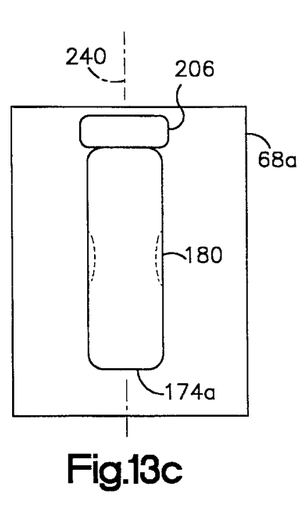

FIGS. 13(a), 13(b) and 13(c) show an alternative embodiment of a work slate unit as previously discussed with reference to FIGS. 8(a), 8(b) and 8(c). In FIG. 13(c) an externally mounted bar scanner unit 206 is removably attached to outer shell 174a of the module docking assembly. When detached, scanner unit 206 may be manually held and operated with signals coupled to the work slate unit by a flexible interconnecting cable, or by optical, infrared or other arrangement for coupling data. Assembly shell 174a is opened by removal of one or more screws permitting the upper section to be separated along line 175 shown in FIG. 13 (b).

With an understanding of the invention, it will be appreciated that forms of work slate units having particular operating capabilities can be provided by selection of appropriate combinations of removable modules. For example, a portable cash register using RF communication can be provided by inclusion of: a bar code scanner module, a magnetic strip reader module, a printer module, an RG communication module, a first power module and a second power module. Inclusion of two power modules in this configuration provides extended portable operating time between required recharging or replacement of power modules. Similarly, a portable parcel shipment tracking unit may typically include the following modules: 2-D scanner, printer, RF communication, first power and second power. A work slate unit including the following modules: display, keypad, laser scanner, RF communication and power module; provides a data collection terminal including a detachable docking assembly usable as a small detached data collection terminal or as an attached terminal operable with visual presentation via the frontal display of the work slate unit. Other module combinations suitable for additional applications can readily be specified.

A number of features of the invention should be noted. In configurations such as already discussed, the module docking assembly is attached to the back of a thin, light weight slate unit in a configuration wherein the entire weight of the module docking assembly and removable modules positioned therein is primarily distributed along a gripping axis 240 indicated in FIGS. 8 and 13. Axis 240 is shown dotted passing through docking assembly 172 in FIGS. 8(b) and 8(c) and is similarly shown in FIGS. 13(b) and 13(c). Thus, with reference to FIGS. 5 and 8(c), with a user's hand gripping handle section 116, or docking assembly shell 174 at finger indentations 180, respectively, a gripping axis extends in a direction nominally parallel to a plane defined by the height H and width W of the frontal display and passing through the length of module docking assembly. As a result of distribution of weight along such axis, rotational moment of the entire slate unit, while it is held, is reduced to provide an ergonomically enhanced weight distribution in use of the work slate unit. More specifically, at least twenty-five percent and typically more of the weight of the entire work slate unit is distributed along the gripping axis such as represented at 240. Ergonomic benefits are enhanced by provision of a thin basic assembly wherein the thickness of the basic assembly (as represented in FIG. 10(b) by the thickness of shell unit 68a) is less than one-quarter of the smaller of the height and width of the basic assembly.

INTELLIGENT BUS

Attention is now directed to the intelligent bus configuration, an embodiment of which is illustrated in FIG. 11, and to its operational capabilities. As previously described, FIG. 11 represents a configurable electronic unit operable with a changeable complement of removable modules via an intelligent bus. FIG. 11 was described in the context of an electronic work slate unit. More generally, the FIG. 11 configuration as shown is also illustrative of a stand alone unit, portable or otherwise, such as represented by unit 174 of FIGS. 9(a) and (b), for example, which may include display, memory, computational and a variety of other capabilities depending upon the particular selection of removable modules chosen.

The arrangement of FIGS. 9(a) and (b) and FIG. 11 includes a plurality of docking positions, shown as provided by guides 186, each arranged to mechanically accommodate a removable module selected from a plurality of removable module types providing different operational capabilities. A variety of such modules are identified above with reference to FIG. 12. As shown, guides 186 accommodate eight removable modules 187–194 in a slidable arrangement. In other embodiments, any suitable arrangement can be employed to mechanically accommodate removable modules to enable them to be positioned in operating cooperation with the electronic unit. Also included are a plurality of standardized docking interfaces represented at 198 in FIG. 11. Each of these standardized docking interfaces is associated with one of the docking positions and each is configured to enable coupling of signals to and from a removable module of any of the plurality of types referred to. As shown, bus configuration 200 is arranged to enable coupling of signals to and from each of the standardized docking interfaces. The FIG. 11 configuration also includes the previously described standardized frame interfaces 196, which may be included for work slate embodiments or excluded in other configurations.

As shown in FIGS. 9(a) and 11, the configurable electronic unit 174 also includes eight removable modules 187–194, each of one of the plurality of different types. Thus, removable module 187 is represented as being removably positioned in a selected docking position, e.g., the upper left position as shown in FIG. 11. As described above, each removable module includes a standardized module interface 204 configured to cooperate with a standardized docking interface 198.

The configurable unit as illustrated further includes bus controller 202 coupled to bus configuration 200. Bus controller 202 is arranged to identify the type of removable module positioned in each docking position. With such identification of a particular removable module, other elements, such as a processor element, are enabled to do at least one of the following: control operation of that removable module, receive data from that removable module for storage, provide data to that removable module for transmission, receive electrical power from that module, operate cooperatively with that module, etc. Typically, the configurable electronic unit will also include a suitable form of case or enclosure which may support a display, include a handle and have other features enabling hand held and other operational capabilities suitable for intended applications.

It will be appreciated that in a variety of prior types of equipment having computer capabilities a pluggable unit of a predetermined type can be positioned in an entry slot and thereby enabled to operate cooperatively with a central processing unit already resident in the equipment. A PCMCIA card is an example. Critical to such prior arrangements is that a predetermined protocol is available and is used for communication between the card and the CPU. In accordance with one embodiment of the invention, a CPU element includes capabilities for communicating via a number of different protocols. Then, a removable module is positioned in a docking position so that a standardized module interface cooperates with a standardized docking interface. While standardized interfaces are thus utilized, different types of removable modules can be operable with different protocols which utilize one or more of the signal paths within the interfaces for different purposes. As a result, whereas in prior arrangements a CPU will "know" how to communicate with and operate cooperatively with an inserted card because the protocol is predetermined, with the use of the variety of types of removable module accepted by the standardized interfaces the CPU will not know what protocol is appropriate.

In accordance with the invention, each removable module, in addition to providing one or more operating capabilities, also includes some provision for enabling its type to be identified. As an example, a certain interface path can be utilized to access a coded or other identifier within the removable module. As a result, when a removable module is first placed in a docking position bus controller 202 is enabled to access the coded identifier in order to identify the type of removable module. Having identified the type of module, the bus controller 202 is arranged to provide information based upon such identification to the CPU and possibly other elements of the electronic unit to enable communication with the module by use of the appropriate protocol. Thus, while the interfaces are physically standardized, the interface and bus usage are configured as appropriate for the particular removable module involved. With an understanding of the invention, it will be apparent that the bus controller may take the form of a separate included element as shown in FIG. 11, may be included as a part of a CPU processor unit, may take the form of a removable module, etc. Given the current state of local network bus control and configuration technology and computation and signal recognition technology in general, skilled persons once having an understanding of the invention will be able to provide a variety of module identification, protocol activation and bus configuration approaches as appropriate for a variety of applications.

As described, the currently preferred embodiment incorporates interfaces to one or more standard removable modules and interface protocols for data exchange that can accept a variety of different peripheral device modules interchangeably, e.g., hard disc drive, floppy disc drive, PCMCIA cards, laser bar code scanner, laser CCD or contact wand bar code reader, CCD or CMOS 2-D bar code reader, printers, magnetic stripe readers, radio or infrared communication units, memory cards including RAM, ROM or EEPROM memory, batteries or other power supply devices, displays of various types, and co-processor modules for multi-processing platform applications. As noted, for each the standardized interface would be identical, but could be different logically as a result of identification and configuration by the bus controller for the specific type of module.

Without attempting to categorize all embodiments which may be implemented by skilled persons in application of the invention, basic functions of the bus configuration and bus controller in a configurable electronic unit include:

initialize removable modules for use, identify removable modules, control operation to enable module insertion without interrupting existing operation ("hot insertions"), enable substitution of the same or different functional types of modules in a given docking position during operation ("hot swaps"), enable removal of modules from docking positions without interruption of other functions of the electronic unit, identify faults in removable modules and identify recovery steps (e.g., identification or addressing errors, port failure, module error or failure, low battery or battery failure, break in bus), provide suitable bus protocol or protocols for operation with a variety of types of modules, accept programming upgrades to provide protocol capability for new types of modules, handle bus contention among active modules and processors, provide power management functions for power conservation in portable and other units.

While many types of pluggable cards and devices have previously been proposed, in accordance with the invention a removable module capable of self-identification would typically include the following. The basic function of the module is enabled by an electronic circuit configuration arranged to provide at least one operational capability. A standardized module interface is arranged to removably couple the module to an electronic unit including a standardized docking interface. The removable module also includes at least one component arranged for identifying such operational capability via the standardized module interface. Suitable modules are described above, particularly with reference to FIGS. 6 and 12, and such component may be part of a circuit arrangement for storing a readable identification code.

Figure 14:
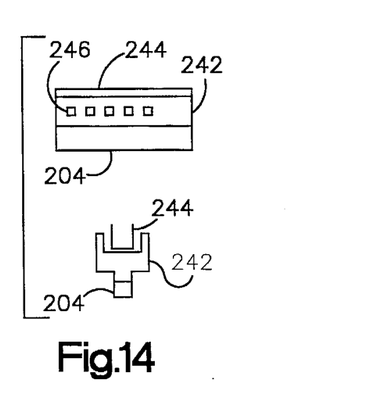
FIG. 14 shows a form of module-identifying adaptor.

It may be desired to use existing or other types of pluggable or other devices which do not include a standardized module interface or a self-identification capability. In such cases, a module-identifying adaptor in accordance with the invention may be employed. Such an adaptor, as represented at 242 in FIG. 14, typically includes the following. A standardized module interface 204 is provided in a form configured to cooperate with a standardized docking interface (e.g., interface 198). A second interface 244 is provided in a form configured to cooperate with a module type device not having a standardized module interface. Intercoupling paths are arranged internally to provide predetermined coupling between the second interface and the standardized module interface. Interfaces 204 and 244, which may be mechanical connectors, are shown in simplified form consistent with FIG. 11. The module-identifying adaptor also includes an identifier arrangement configured to provide identification of an operational capability of the removable module (e.g., the module type) via the standardized module interface 204. Different types of identifier arrangements can be provided. For example, a customized adaptor provided for a particular device incorporating a PCMCIA interface of type 1, 2 or 3 would internally include appropriate interface coupling circuitry as necessary for the operative transition to the standardized module interface 204, from a PCMCIA type interface provided at 244. With this arrangement, the adaptor 242 would include at least one component arranged to enable identification of the type of device by the bus controller 202 after such PCMCIA type device is positioned in interface 244 and interface 204 is positioned in a docking interface 198. In an alternative arrangement, a module-identifying adaptor 242, which may include an interface 244 suitable for cooperation with a PCMCIA interface, is not customized for identification of any particular device. Instead, after a specific PCMCIA type device is selected, a series of switches indicated at 246 are selectively set to provide a binary representation of a predetermined code identifying the specific PCMCIA type device. The switch settings thus provide an identifier arrangement which can be read by the bus controller to identify the specific PCMCIA type device involved. With an understanding of the invention, skilled persons will be able to provide a variety of forms of suitable adaptors and identifier arrangements. The adaptors may typically include a plastic body proportioned to be accommodated by the configurable electronic unit and appropriate mechanical connectors or other forms of interfaces. In this manner, off-the-shelf peripheral module devices can be utilized with configurable electronic units using the invention. Alternatively, modified PCMCIA type cards and other devices can be modified to be compatible with standardized docking interfaces and provide an identifier arrangement identifiable in accordance with the invention.

The invention has been described with reference to the preferred embodiment. Obviously, modifications and alterations will occur to others upon the reading and understanding of this specification. It is intended that all such modifications and alterations be included insofar as they come within the scope of the appended claims or the equivalents thereof.

What is claimed is:

1. A portable configurable electronic unit, operable with a changeable complement of removable modules, the complement of removable modules including a plurality of module types, each different module type providing different operational capabilities, the unit comprising:

a) a housing supporting electronic circuitry including a processor and a memory accessible by the processor, the housing further including a hand gripping portion for supporting the unit with a hand of a user and including a plurality of docking positions each configured to releasably support a selected removable module;

b) each of the plurality of docking positions including a standardized docking interface having electrical connectors which engage corresponding electrical connectors of a standardized module interface of a module removably attached to the docking position to enable coupling of electrical signals between the docking interface and the module;

c) a bus configuration including a bus controller, the bus configuration electrically coupled to the processor and a docking interface of each of the plurality of docking positions to electrically couple the processor and the docking interfaces;

d) the bus controller configured to send an identification signal to the processor identifying a module type of a module upon attachment of the module to a selected one of the plurality of docking positions;

e) programming stored in the memory and executed by the processor to enable the processor to control an operation of each module attached to a selected different one of the plurality of docking positions, the programming stored in the memory prior to attachment of any of the modules to any of the docking positions; and f) the programming including at least one program uniquely associated with each of the plurality of module types, the processor, upon receiving a model type identification signal from the bus controller, executing the at least one program associated with the identified module type of the module to control operation of the module.

2. A portable configurable electronic unit as in claim 1 wherein each module includes a coded identifier, the coded identifier being different for each of the plurality of module types, the bus controller including circuitry for decoding the coded identifier of a module upon attachment of the module to a selected one of the plurality of docking positions and sending an identification signal corresponding to a module type of the module to the processor.

3. A portable configurable electronic unit as in claim 1, wherein the processor controls an operation of a module attached to a selected one of the plurality of docking positions to enable the electronic circuitry of the unit to perform at least one of the following functions: providing data to the module, receiving data from the module, and receiving electrical power from the module.

4. A portable configurable electronic unit as in claim 1, wherein the plurality of removable module types include: a bar code reader module, a radio communication module, a disc drive module, a printer module, a magnetic stripe reader module, an infrared communication module, a memory module, a power module, a display module, and a co-processor module.

5. A portable configurable electronic unit as in claim 1, wherein said processor is supported within a removable module positioned in a selected one of the plurality of docking positions.

6. A portable configurable electronic unit as in claim 1, wherein said bus controller is a portion of said processor.

7. A portable configurable electronic unit as in claim 1, wherein the hand grip portion is rotatable with respect to the housing and includes an interior region in which a source of electrical power is disposed.

8. A configurable electronic unit as in claim 1, wherein the housing includes an opening to an interior region and at least one of the plurality of docking positions is supported within the housing region and comprises a frame configured to support a selected one of a plurality of thin, rectangular shaped modules, the docking position frame including a docking interface and being accessible through the opening, the selected module being slid along a surface of the frame until connectors of a module interface of the module engage corresponding connectors of the docking position docking interface.

9. A portable configurable electronic unit as in claim 1, wherein said bus controller is a removable module which is positioned in a selected one of the plurality of docking positions.

10. A portable configurable electronic unit as in claim 1, wherein said configurable electronic unit includes a portable, battery powered, computerized display unit.

11. A portable work slate computer comprising:

a) a housing including an interior region supporting work slate electronic circuitry including a processor and a memory accessible by the processor, the housing further including a hand grip portion for supporting the computer with a hand of a user;

b) a set of modules including a plurality of module types wherein each module type performs a different function when operatively attached to a selected one of plurality of docking stations supported by the housing;

c) each of the docking stations including a docking interface adapted to engage a module interface of a module to electrically couples a bus configuration supported in the work slate housing to the module;

d) the bus configuration electrically coupling the processor to each of the docking station docking interfaces, the bus configuration including a bus controller configured to send an identification signal to the processor identifying a module type of a module upon attachment of the module to a selected one of the plurality of docking stations;

e) programming stored in the memory and executed by the processor to enable the processor to control an operation of each module attached to a selected different one of the plurality of docking stations, the programming stored in the memory prior to attachment of any of the modules to any of the docking stations; and f) the programming including at least one program uniquely associated with each of the plurality of module types, the processor, upon receiving a model type identification signal from the bus controller, executing the at least one program associated with the module type of the module to control operation of the module.

12. The portable work slate computer of claim 11 wherein the hand grip portion is rotatable with respect to the housing and includes an interior region in which a source of electrical power is disposed.

* * * * *